(12) United States Patent
Nagaratnam et al.

(10) Patent No.: US 9,762,616 B2
(45) Date of Patent: Sep. 12, 2017

(54) APPLICATION-BASED SECURITY RIGHTS IN CLOUD ENVIRONMENTS

(71) Applicant: International Business Machines Corporation, Armonk, NY (US)

(72) Inventors: Nataraj Nagaratnam, Cary, NC (US); Jeffrey Robert Hoy, Southern Pines, NC (US); Kaushal Kiran Kapadia, Pune (IN); Ravi Krishnan Muthukrishnan, Bangalore (IN); Sreekanth Ramakrishna Iyer, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 14/821,707

(22) Filed: Aug. 8, 2015

(65) Prior Publication Data

US 2017/0041347 A1    Feb. 9, 2017

(51) Int. Cl.
*H04L 29/06* (2006.01)
*G06F 21/10* (2013.01)

(52) U.S. Cl.
CPC ........ *H04L 63/20* (2013.01); *H04L 29/06986* (2013.01); *H04L 63/0227* (2013.01); *H04L 63/0254* (2013.01); *G06F 21/10* (2013.01)

(58) Field of Classification Search
CPC .............. G06F 21/10; H04L 29/06578; H04L 29/06986; H04L 63/0227; H04L 63/0254; H04L 63/20
USPC .......................................................... 726/1
See application file for complete search history.

(56) References Cited

U.S. PATENT DOCUMENTS

| | | | |
|---|---|---|---|
| 6,986,135 B2 | 1/2006 | Leathers et al. | |
| 8,055,904 B1 | 11/2011 | Cato et al. | |
| 9,072,972 B2* | 7/2015 | Ahiska | H04L 65/105 |
| 9,225,720 B1* | 12/2015 | Chandrasekhar | H04L 63/10 |
| 9,501,541 B2* | 11/2016 | Bolignano | H04L 41/5041 |

(Continued)

FOREIGN PATENT DOCUMENTS

| | | |
|---|---|---|
| EP | 1367475 A2 | 6/2009 |
| WO | WO2012146985 A2 | 11/2012 |

*Primary Examiner* — Hadi Armouche
*Assistant Examiner* — Shahriar Zarrineh
(74) *Attorney, Agent, or Firm* — Jeffrey S. LaBaw; David H. Judson

(57) ABSTRACT

This disclosure provides the ability for a cloud application to specify its security requirements, the ability to have those requirements evaluated, e.g., against a specific cloud deployment environment, and the ability to enable the application to control a cloud-based security assurance service to provision additional security technology in the cloud to support deployment (or re-deployment elsewhere) of the application if the environment does not have the necessary topology and security resources deployed. To this end, the application queries the service by passing a set of application-based security rights. If the security capabilities provided by the security assurance service are sufficient or better than the application's security rights, the application functions normally. If, however, the security environment established by the security assurance service is insufficient for the application, the application is afforded one or more remediation options, e.g., issuing a request to upgrade the security environment, or the like.

15 Claims, 7 Drawing Sheets

(56) References Cited

U.S. PATENT DOCUMENTS

| | | |
|---|---|---|
| 2003/0009250 A1 | 1/2003 | Resnick et al. |
| 2005/0086502 A1 | 4/2005 | Rayes et al. |
| 2005/0096937 A1 | 5/2005 | Subash et al. |
| 2008/0222697 A1 | 9/2008 | Birk et al. |
| 2009/0228579 A1 | 9/2009 | Sanghvi et al. |
| 2010/0095235 A1 | 4/2010 | Bennett et al. |
| 2010/0132016 A1* | 5/2010 | Ferris ................ G06F 21/6218 726/4 |
| 2010/0251328 A1* | 9/2010 | Syed ..................... G06F 21/53 726/1 |
| 2010/0287598 A1 | 11/2010 | Korkishko et al. |
| 2010/0318658 A1 | 12/2010 | Zorn et al. |
| 2011/0258692 A1* | 10/2011 | Morrison ............... G06F 21/53 726/11 |
| 2011/0265168 A1* | 10/2011 | Lucovsky ........... H04L 63/0245 726/7 |
| 2011/0295986 A1 | 12/2011 | Ferris et al. |
| 2012/0005724 A1* | 1/2012 | Lee .................... H04L 63/0209 726/1 |
| 2012/0066670 A1* | 3/2012 | McCarthy ........... H04L 41/0806 717/169 |
| 2012/0185913 A1* | 7/2012 | Martinez ................ G06F 9/455 726/1 |
| 2012/0222084 A1* | 8/2012 | Beaty .................. H04L 43/0817 726/1 |
| 2013/0019315 A1 | 1/2013 | Chen et al. |
| 2013/0066940 A1 | 3/2013 | Shao et al. |
| 2013/0104236 A1 | 4/2013 | Ray et al. |
| 2013/0111548 A1 | 5/2013 | Kanoun et al. |
| 2013/0167253 A1 | 6/2013 | Seleznev et al. |
| 2013/0219456 A1* | 8/2013 | Sharma ............... H04L 63/0815 726/1 |
| 2013/0238772 A1* | 9/2013 | Armour ................ G06F 9/4843 709/223 |
| 2013/0254411 A1* | 9/2013 | Cochran .................... G06F 9/54 709/228 |
| 2013/0263209 A1* | 10/2013 | Panuganty .............. H04L 43/04 726/1 |
| 2013/0305376 A1* | 11/2013 | Chauhan ................ G06F 21/577 726/25 |
| 2013/0311894 A1 | 11/2013 | Rexer et al. |
| 2014/0040473 A1 | 2/2014 | Ricky et al. |
| 2014/0137179 A1* | 5/2014 | Christodorescu ....... G06F 21/53 726/1 |
| 2014/0137244 A1* | 5/2014 | Banerjee ................ G06F 21/52 726/22 |
| 2014/0337528 A1* | 11/2014 | Barton .................... H04L 41/00 709/225 |
| 2015/0046507 A1* | 2/2015 | Saxena ................... H04L 63/20 709/201 |
| 2015/0121155 A1* | 4/2015 | Boshev .................. H04L 67/10 714/48 |
| 2015/0172321 A1* | 6/2015 | Kirti ................... H04L 63/1416 726/1 |
| 2015/0222620 A1* | 8/2015 | Subramanian ........ H04L 63/102 726/4 |
| 2015/0312274 A1* | 10/2015 | Bishop .................... H04L 63/20 726/1 |

\* cited by examiner

APPLICATION-BASED SECURITY RIGHTS IN CLOUD ENVIRONMENTS

BACKGROUND OF THE INVENTION

Technical Field

This disclosure relates generally to deploying applications in a "cloud" compute environment.

Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

It is known in the art to provide appliance-based or platform-based solutions to facilitate rapid adoption and deployment of cloud-based offerings. Typically, a cloud-based offering is deployed as a cloud application package. One such appliance that may be used for this purpose is IBM® Workload Deployer, which is based on the IBM DataPower® 7199/9005 product family. Typically, the appliance is positioned directly between the business workloads that many organizations use and the underlying cloud infrastructure and platform components. Alternatively, cloud application packages may be deployed using platform-as-a-service (PAS) infrastructure, such as the IBM® SmartCloud® Orchestrator open cloud management platform. A management platform of this type typically comprises several layers including an infrastructure services layer for provisioning, configuring and managing storage, compute and network resources, a platform services layer, and an orchestration services layer to provide business process management. The platform services layer includes virtual machine image lifecycle management capabilities and related services. The platform services layer includes virtual machine image lifecycle management capabilities and pattern services, wherein a "pattern" provides deployment and management instructions for the business service. A pattern preferably is an XML-based definition of an infrastructure configuration required to provision and managed the various resources (e.g., compute, networking, storage, OS, middleware, and the like) for a specific application (or application-type) workload.

As security software deployments become increasingly complex, application developers are further removed from the inner workings of the security environment. As a consequence, security operations often are left to the security experts. The move to virtualization and private clouds, however, empowers application developers with more and more operational capability. Application developers then find themselves in a difficult position. In particular, when putting an application into production, the developer may not have the necessary background and context to evaluate properly the security impact and needs of his or her application. Today, application developers often work with security experts to design a strategy for secure application deployment. The security expert, however, may encounter the same problem, but from the other direction. As applications and middleware become increasingly complex and virtualized, the security expert may not fully understand the application to properly evaluate its security impact and needs.

Software applications often have complex and demanding security requirements, especially as tailored security environments are built around cloud applications. These applications may have quality-of-service type security requirements, e.g., a banking application that is required legally to use transport layer security for all communications, or relationship requirements, e.g., the banking application cannot be hosted in a same security environment with a credit card processing application, and so forth.

It is also known to provide for automated deployment and management of cloud applications. Although these approaches provide significant advantages, they do not provide the capability for an application to make a decision over its security environment, e.g., to evaluate whether the environment is sufficient for application function. The lack of application-based enforcement opens up the possibility for intentional or accidental misconfiguration of the security environment, thereby exposing the application to security risks.

BRIEF SUMMARY

According to this disclosure, a mechanism is provided to enable a cloud application to prescribe its own security requirements, and then to pass those requirements into (and for analysis by) a security assurance service that is responsible for generating and managing security environments (so-called "secure application zones") for cloud applications. Security may be defined at any granularity, e.g., using generic requirements (e.g., "high security"), or specific requirements (e.g., TLS key length, etc.), as well as potential relationship requirements that describe the application's purpose and a relationship of the application to one or more other applications. The data set comprising the application's security requirements (or "security rights") is then exposed by the application to the cloud infrastructure "security assurance" service.

The security assurance service operates generally to deploy security environments (the "secure application zones") for applications running in the cloud environment. According to this disclosure, after the security assurance service deploys the security zone for the particular application, the application queries the service by passing (e.g., in an application payload) its security rights. If the security capabilities provided by the security assurance service are sufficient or better than the application's security rights, the application functions normally. If, however, the security environment established by the security assurance service is insufficient for the application, the application is afforded one or more remediation options, e.g., shut down (self-deactivation) and administrator notification, issuing a request to the security assurance service to upgrade the security environment, issuing a request to the service to transfer the application to a different cloud security assurance zone, or to a cloud platform with a greater range of security capabilities, issuing a request to the service to transfer to a different cloud zone or cloud platform (e.g., to avoid a hosting conflict, etc.). The security assurance service then attempts to implement the remediation option. Upon completion of the option (e.g., upgrade of the security environment, transfer to a new environment, etc.), the application may again query the security assurance service, and the process may be repeated.

Typically, the described above of having the security assurance service validate its then-existing security zone for the application against the application-based security rights (ABSR) is carried out following application deployment (and following implementation of a remediation option), the same approach may be used during normal application processing in the environment. Thus, the approach may be carried out periodically, continuously, synchronously or asynchronously, such as when the application receives a notification that that the cloud environment has changed in some way.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
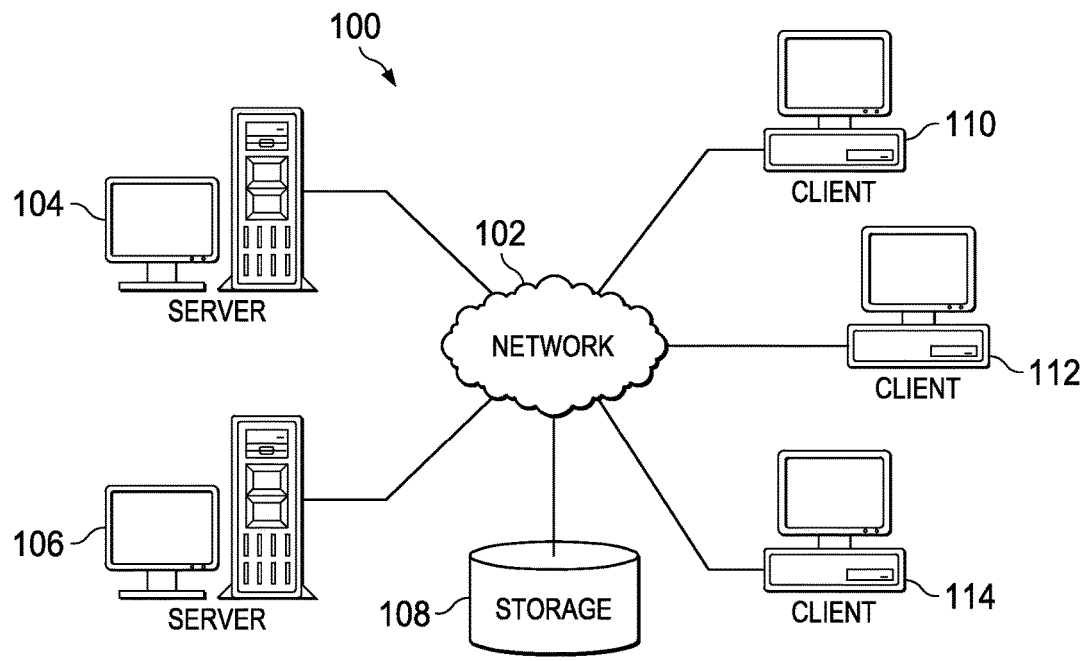
FIG. 1 depicts an exemplary block diagram of a distributed data processing environment in which exemplary aspects of the illustrative embodiments may be implemented.
Figure 2:
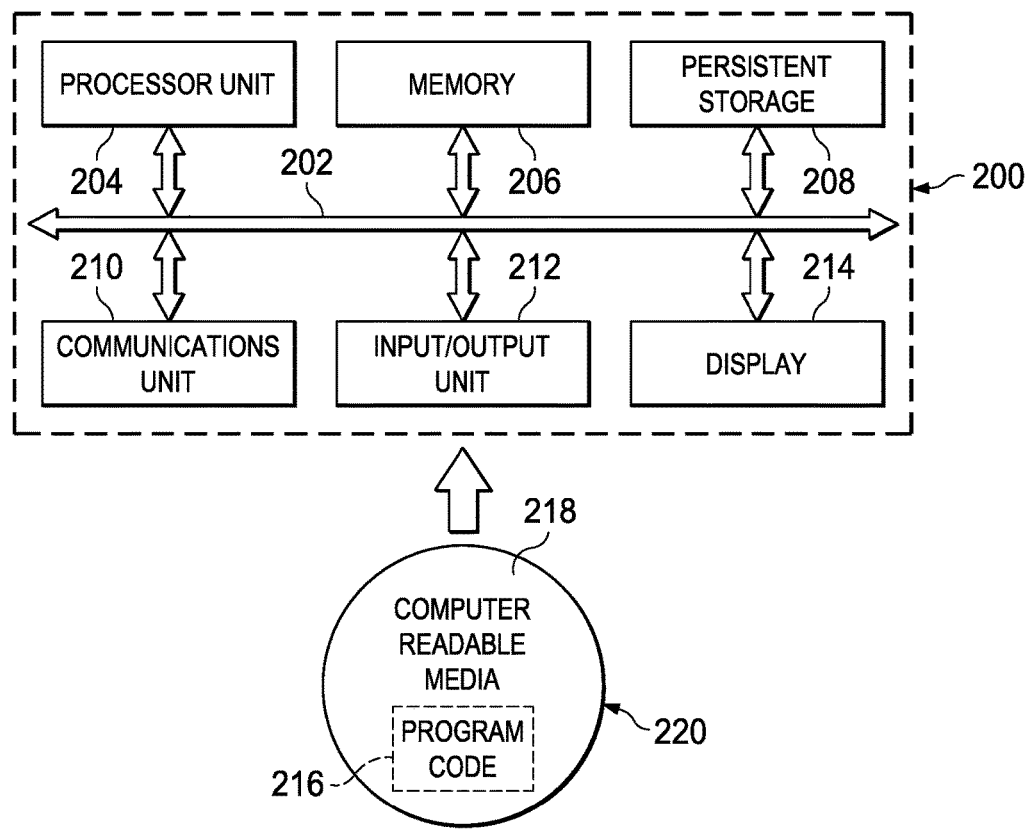
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines.

End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
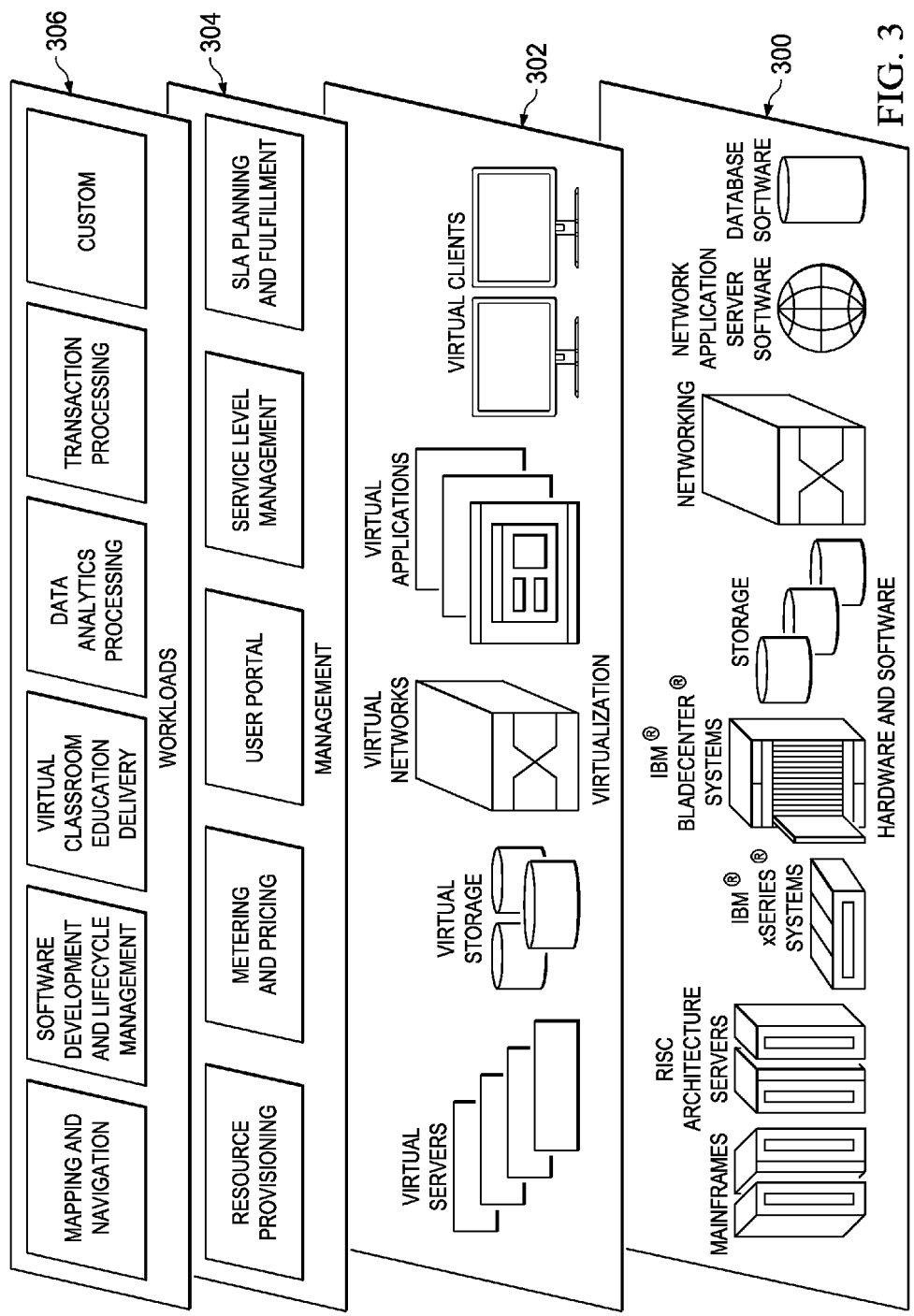
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others (e.g., enterprise-specific functions in a private cloud).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Cloud Deployment Technologies

It is known to provide an appliance-based solution to facilitate rapid adoption and deployment of both Infrastructure and Platform as Service offerings. As described above, one such appliance is IBM Workload Deployer (IWD), and this appliance also may be used to manage a shared, multi-tenant environment, where isolation and security are of utmost importance. The secure nature of the physical appliance (sometimes referred to herein as a box) typically is provided by a self-disabling switch, which is triggered if the appliance cover is removed. This physical security enables the appliance to serve as a secure vault for credentials, which can be tied to virtual images throughout their entire lifecycle (in storage, being dispensed, running in the cloud, or being removed from the cloud). IBM Workload Deployer also contains a storage driver that streamlines the storage of image customizations. It also serves as a dedicated store for both pre-loaded and customized middleware virtual images and patterns. The appliance also includes advanced compression and storage techniques that enable a large number of these virtual images (each of which may be sizeable) to be stored.

In operation, the appliance can provision standard and customized middleware virtual images and patterns that can be securely deployed and managed within private or on-premise cloud computing environments. These virtual images can help organizations to develop, test, and deploy business applications easily and quickly, thus ending the manual, repetitive, and error prone processes that are often associated with creating these complex environments. Upon completion, resources are returned to the shared resource pool automatically for future use and are logged for internal charge-back purposes. The appliance also manages individual user and group access to resources, providing IT managers with the control needed to optimize efficiency at a fine-grain level.

Typically, the appliance includes hardware and firmware cryptographic support to encrypt all the data on hard disk. This data includes, without limitation, event log data. No users, including administrative users, can access any data on physical disk. In particular, the operating system (e.g., Linux) locks down the root account and does not provide a command shell, and the user does not have file system access. When an administrator performs a backup of the appliance, the backup image is encrypted to protect the confidentiality of the data. When restoring an encrypted image, a decryption key thus is needed to decrypt the backup image to enable the data to be restored to the appliance.

Figure 4:
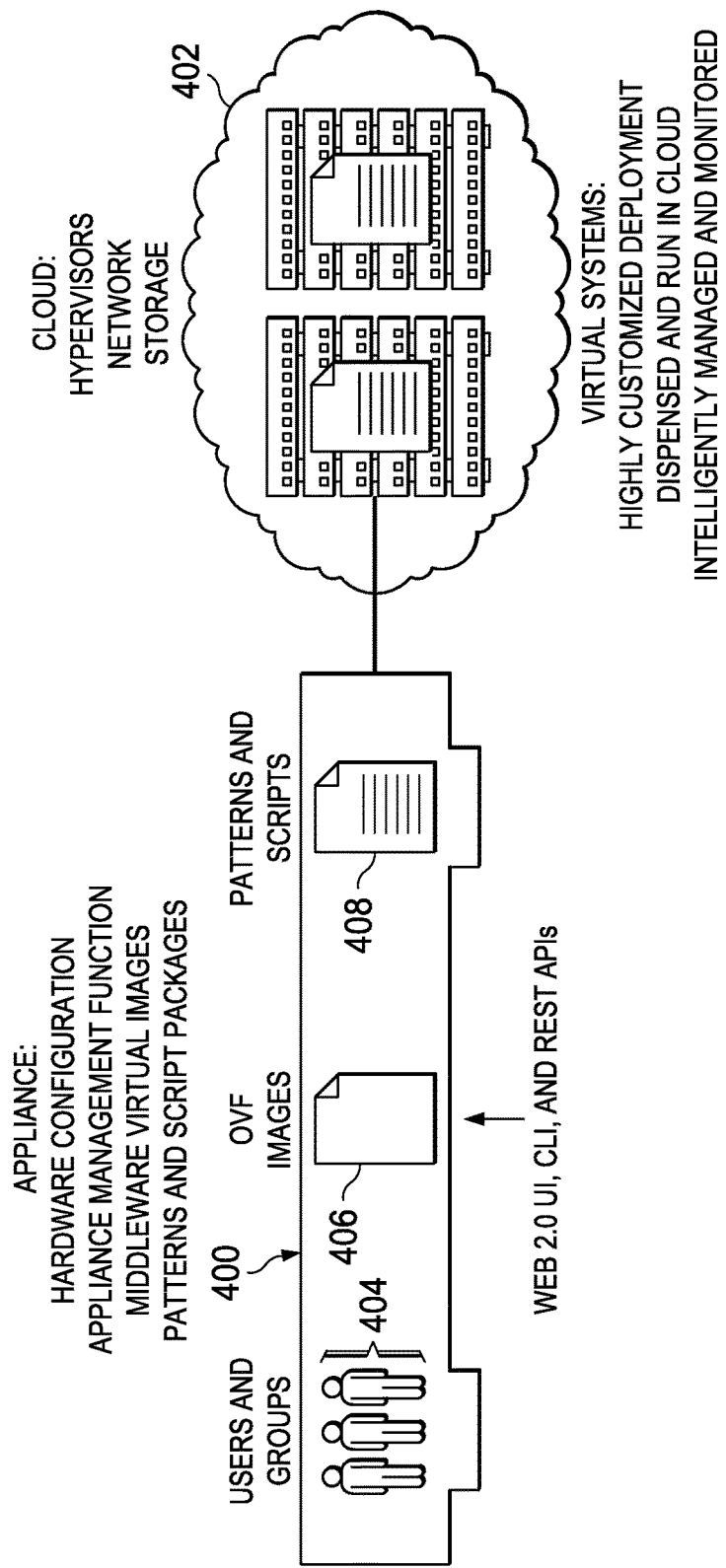
FIG. 4 illustrates an exemplary operating environment in which a network-based appliance may be used to facilitate deployment of one or more cloud-based offerings.

Referring to FIG. 4, a representative operating environment includes the physical appliance 400, which interfaces to the cloud 402. The appliance may be implemented using a data processing system such as described above with respect to FIG. 2. Preferably, the appliance 400 includes a Web 2.0-based user interface (UI), a command line interface (CLI), and REST-based application programming interfaces (APIs). The appliance provides a management function that enables the rapid deployment of cloud-based solutions. To that end, the appliance provides storage for (i) data 404 used to manage user and group access to resources, (ii) for pre-loaded and/or customizable middleware virtual images 406, and (iii) for configurable patterns and script packages 408. Patterns are logical descriptions of both the physical and virtual assets that comprise a particular solution. As will be described in more detail below, preferably patterns are structured according to the TOSCA specification. The management function and interfaces provide a template-based approach to construction that permits the rapid creation and modification of an otherwise complex set of hardware and software components. In particular, the use of patterns allows an organization to construct an individual element or integrated solution one time, and then to dispense the final product on demand. Typically, there are two types of patterns: virtual system patterns provide the most flexibility and customization options of the two types. It consists of an operating system and, potentially, additional software solutions, such as WebSphere® Application Server. Virtual application patterns are optimized and are constructed typically for the purpose of supporting a singular workload.

As also seen in FIG. 4, the on-premise or private cloud environment 402 on which the middleware application runs typically constitutes hypervisors, networking infrastructure, and storage devices that are allocated to the appliance. A representative environment may be implemented in the manner described above with respect to FIG. 3.

Figure 5:
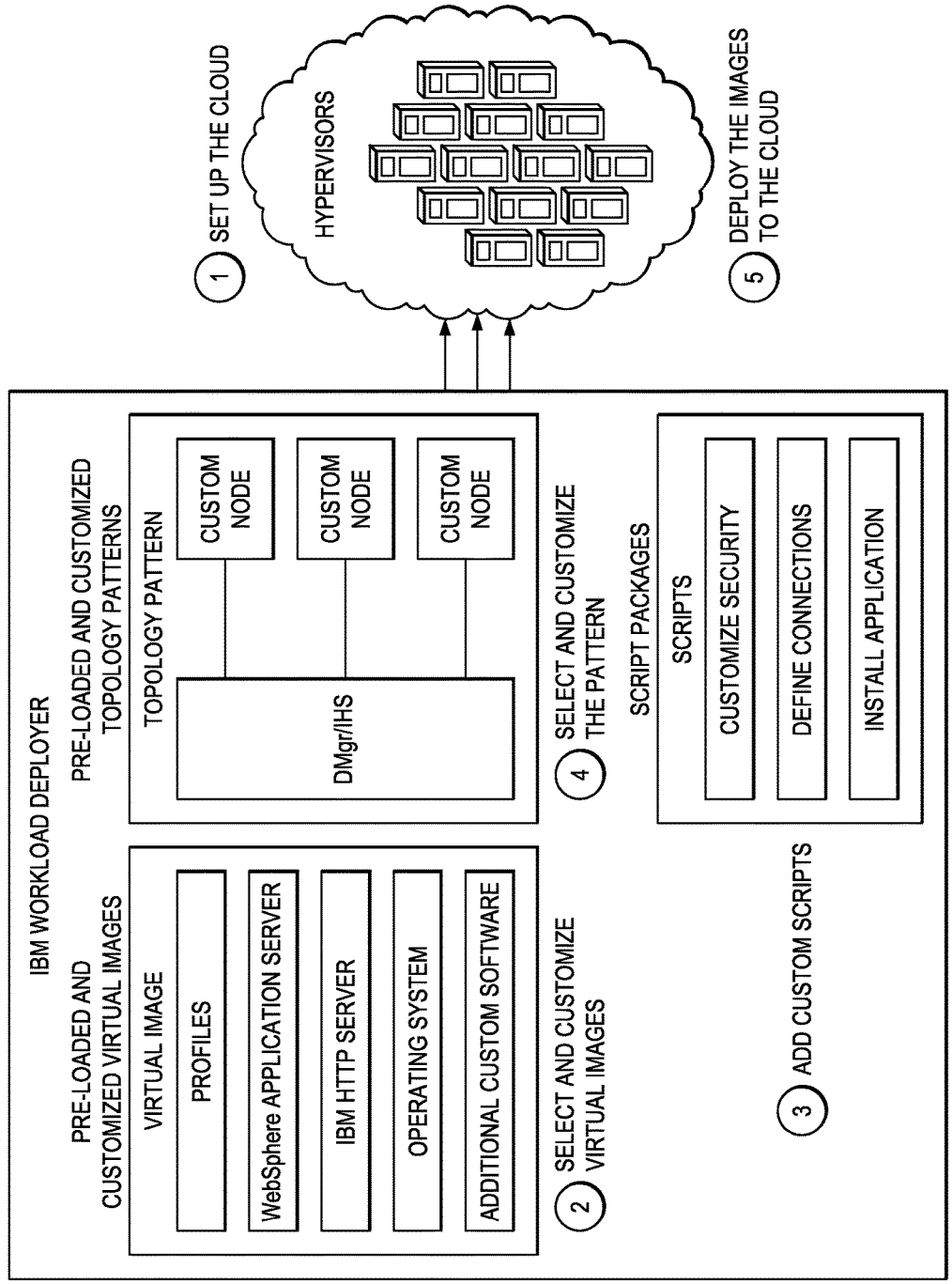
FIG. 5 illustrative representative functional components of the network-based appliance.

FIG. 5 illustrates how the appliance can be used to build a custom private cloud. At step 1, the hardware, hypervisors and networking for the cloud are identified. At step 2, the user selects and customizes the virtual images. At step 3, the user adds one or more script packages as needed to customize the deployed middleware environment. At step 4, pre-installed or customized patterns are used to describe the middleware topology to be deployed. Patterns can be built from virtual images, e.g. using a drag-and-drop interface. At step 5, the virtual systems are deployed to the cloud.

The references herein to IBM Workload Deployer are exemplary and should not be taken to limit the disclosed technique, which may be implemented on any appliance (or, more generally, machine) having the general characteristics and operating functionality that has been described. Specific references to IWD should be construed to include both the above-identified product, as well as other technologies that implement the functionality referenced above.

Context-Based Security Assurance Service

As further background, the following section describes a "context-based security assurance service" or a "security assurance service" (or just the "service" as a short-hand) in which the cloud bursting techniques of this disclosure are implemented.

Without limitation, the security assurance service may be implemented within or in association with a cloud deployment platform system or appliance (FIG. 4) as has been described, or using any other type of deployment systems, products, devices, programs or processes. A representative cloud application platform with which the security assurance service may be implemented includes, without limitation, IBM® PureApplication System, which is a platform system specifically design and tuned for running applications, and that supports the use of patterns for easy deployment into its cloud environment. The reference to this commercial system is not intended to be limited, as the security assurance service may interoperate with any cloud infrastructure.

The security assurance service may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

The following is a high-level description of the security assurance service. Generally, the service operates generally to gather (or otherwise obtain from other data sources) information about available cloud platforms, topologies and capabilities. The service also identifies security capabilities that are available to be setup. These security capabilities include, without limitation, virtual perimeter networks (DMZs), network segregation, storage isolation, Intrusion Prevention System (IPS) deployment, Security Information and Event Management (SIEM) deployment, reverse proxies, firewalls, SSL communication, configuration with existing SIEM, multi-factor authentication, risk-based authentication, and others. Preferably, the service simplifies (or abstracts) the available capabilities into easy-to-understand security assurance categories for the environment's existing topology. As a non-limiting and representative example, one such categorization may include "high/medium/low"-style categories, where, say, a "medium" assurance may correspond to SSL-protected traffic, IPS and SIEM integration, but no resource segregation and isolation of multi-factor authentication.

Preferably, the assurance service exposes the categories to the user (during application deployment) as "templates." A template has a given set of one or more security configuration changes associated therewith. The user (typically the application developer) then selects one or more of such security templates that he or she would like the service to configure/provision the application against. The service may provide a recommendation to the user in this regard. Based on the user selections, the service then interprets the requested one or more security assurance templates and, in response, generates a concrete list of one or more security configuration changes (typically changes/updates to security settings to existing security infrastructure). Optionally, the service also generates a note to the security administrator(s) of the capabilities being used for the application. During the application deployment, the service applies the security changes, preferably remotely, using REST-based (or equivalent) interfaces to existing (configured) security products, and, as necessary to meet the template(s), it also deploys new security software instances (as applicable and if licenses are available). The service may also provision hardware and network environments, preferably using existing cloud facilities, and as needed by the application. In this manner, the security assurance service creates a context-specific secure cloud application zone for the application-being-deployed. The application deployment platform is called-back when the security configuration update completes; the platform then completes the deployments, and activates the newly-deployed and secured application.

As described, the assurance service preferably operates in a context-based manner, taking into consideration the "context" in which the application is to be deployed. Representative "context" information includes, without limitation, the nature of the target platform, the nature of the environment in which the workload is anticipated to execute, the nature of any compliance or other regulatory requirements for the workload, and so forth. Thus, for example, if the workload is being deployed on the Amazon cloud (which is public), the service would consider public cloud requirements, such as SSL communication for all traffic, even though such requirements would not necessarily be enforced in a private cloud. As another example, if the workload is running in a test or development environment, service may only provision minimal controls around data, as the application (in this context) would not be handling real (live) customer data. As yet another example, if the workload needs to be PCI-compliant, then the service may provision it only on a certain network but not allow (or otherwise block) the move of the workload to a network or VLAN that is not secure. These are merely representative examples. The security context information is gathered by the security assurance service directly, or such information is made available to the security assurance service from other connected data sources that have that information (or access to that information).

Figure 6:
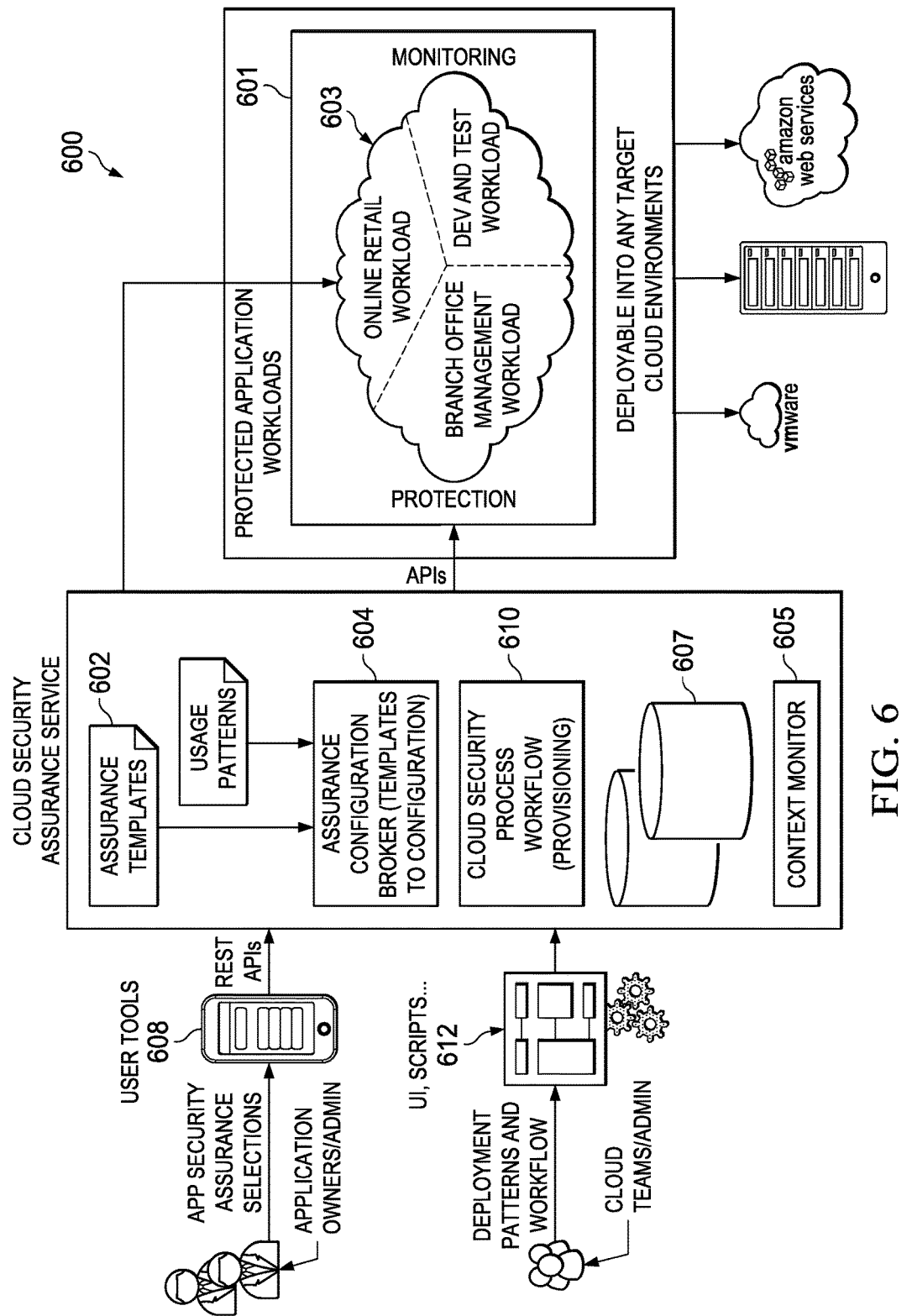
FIG. 6 illustrates a block diagram of the basic operational components of the security assurance service of this disclosure.

FIG. 6 illustrates the basic components of a representative embodiment of a cloud security assurance service 600. As described, the approach provides for a centralized or federated service that manages all (or defined ones of) security resources impacted by application deployment. These resources may be quite varied and include, among others, reverse proxies, HTTP servers, authorization updates, addition of new identities, provisioning of VPNs, log integration with a SIEM solution, DMZs, firewall configuration to open ports, and so forth. Preferably, the service invokes remote interfaces (e.g., REST-based interfaces) to update configurations for the security resources. The determination of which security resources get updated and how depends on a template-based approach. In particular, the service 600 provides for one or more security assurance templates 602 (or just "templates") that are preferably based on and derived from available resources and configuration information discovered by (or otherwise made available to) the service. In the alternative, a security template may be predefined or relatively "static" based on information derived from other security infrastructure implementations (or knowledge bases). Preferably, and as used herein, the assurance templates 602 are modules within the service that provide easy-to-understand security categories or profiles, and their associated security levels, such as "high/medium/low internal network security" and "high/medium/low firewall security," and the like. The service 600 also includes an assurance configuration broker 604, which identifies the security goals of selected templates, and that operates to translate selection of a template into detailed configuration steps, preferably based on system configuration and context of available resources. This translation operation is described in more detail below.

As depicted, the security assurance service also preferably includes (or has associated therewith) a context monitor 606, which catalogs and tracks cloud topologies and capabilities. Further, the service includes (or has associated therewith) a security management interface 608, which is a configuration point that is used to add or remove security templates, to provide manual configuration of managed security resources, and/or to override (under permitted circumstances) a security template selected by an end user. The security assurance service also includes a cloud security process workflow 610, which is a module that invokes appropriate (e.g. REST-based) interfaces to apply changes to underlying security infrastructure (security resources) as indicated by the configuration broker 604. An assurance pattern module 612 is a cloud-specific service that coordinates application deployment and provisioning with the security assurance service 600. Typically, the assurance pattern module 612 comprises a component of some other cloud application platform, although this is not a requirement. The assurance pattern module 612 queries the assurance service for available assurance templates 602 based on the application being deployed.

In FIG. 6, the application owners/administrators at the top left represent the application deployer(s); these are individuals who preferably only need to have access to the easy-to-understand security assurance level designators (by category/security level). The cloud teams or other administrators at the bottom left represent individuals who might require more specific information about the underlying security settings for security resources that provide these security assurance levels.

These above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions of the security assurance service be executed by a particular component as named above, as the functionality herein (or any aspect thereof) may be implemented in other or systems.

The security assurance service may be implemented by a cloud service provider that operates infrastructure for a private cloud, a public cloud, or a hybrid cloud. In one particular implementation scenario, an enterprise has an associated private cloud (implemented within a cloud service) that is managed by a cloud application platform. That platform may then be augmented to interoperate with (or to actually include) the security assurance service of this disclosure. More generally, the security assurance service may be implemented by an enterprise in a standalone manner. It may be available as a managed service provided by a cloud service or some other service provider.

The service operates by having an end user provide a generalized specification of a security level (e.g., "high network security") that the service then uses (after interpreting application requirements and available resources) to generate a security-optimized deployment for an application. Typically, the application is being deployed into an existing environment, and the security assurance service operates to define and/or tailor the security configuration changes required for that existing environment (into which the application will be deployed). The security-optimized deployment for the application is sometimes referred to herein as a secure context-based "cloud application zone" or, as a shorthand, a "secure application zone."

The "security levels" as used herein are sometimes referred to as "security assurance levels." These levels, as noted above, are exposed as easy-to-understand or "coarse" grained descriptors ("high" or "low"), as compared to more fine-grained specificity that might otherwise be known or available to, say, a security expert. The terms "coarse" or "fine" are relative phrases, but the notion of a "coarse" designation of a security assurance level is one that merely provides the basic information available to the user who might not otherwise know or be able to ascertain (or care about) the explicit security requirements underlying a particular "coarse" security assurance level. It is sufficient for the user in this circumstance to know only that the security assurance level he or she desires (for a particular category) be "high" or "low" or some other such classification (however delineated). Thus, the term "high" (in reference to a particular coarse security assurance level) may be designated in the alternative by a numerical value, some other identifier or designation.

In a representative embodiment, the service exposes, provides or interoperates with a set of security templates, which may be categorized according to type. These templates are provided by the assurance template module shown in FIG. 6. Thus, for example, the service may expose security templates having the following categories: "Internal Network Security," "Application Security," "Data Security" and "Intruder Protection." These are merely representative. A particular template category may then be identified according to a defined security level: such as "Low" or "High." The service may provide just "Low" or "High" templates, or it may provide further levels (e.g., Low, Medium and High, or further more specific levels, etc.). A particular enterprise application being deployed thus may have one or more such security templates associated therewith, each defining a category and a specified security level. Thus, for example, a particular application being deployed may have the following specification: Internal Network Security (Low), Application Security (High), Data Security (High) and Intruder Protection (High). A web-based or other configuration interface may be used to specify the one or more security templates that are to be associated with a particular application being deployed. This interface may be associated with a conventional workload deployment tool, such as IBM® Workload Deployer Virtual Application Builder. In an alternative, the categories and security levels are defined automatically or programmatically, or such information is made available from a repository of such data published by another source.

As used herein, a "template" or "security template" refers to a profile or set of security settings that are expected to provide a specific level of security on or with respect to a given security resource, which security resource may be a system, device, appliance, program, process or other computing entity within the security infrastructure. Preferably, each security template has associated therewith one or more security configurations (security resource settings) that implement the category (and at the specified level). Preferably, these security configurations are identified by the security assurance configuration broker component (see, FIG. 6), which takes (as input) the security goals of the selected template and translates that selection into detailed configuration steps (or changes) based on the system configuration and the context of available resources (as supplied by the context monitor).

Thus, for example, if the application category is "Internal Network Security" and the security level is, say, "Low," the broker determines that the detailed security steps necessary to implement that template might include: (i) creating a "junction" between a front-end proxy server and a back-end Web application server based on application endpoint, (ii) use basic authentication for the junction and configure a trust association interceptor (TAI) in the application server for single sign-on (SSO), and (iii) enable restrictive firewalls, and open ports to the application endpoint. As another example, if the application category is "Application Security" and the security level is, say, "High," the detailed security steps necessary to implement that template might include: (i) run a security analytic tool (e.g., AppScan) against endpoints and halt deployment if any critical vulnerabilities are identified, (ii) instruct the cloud application platform to provision a VPN to host the application in the cloud, (iii) configure access manager policies for authorized roles defined by the application, and (iv) create an additional software-based DMZ in the cloud dedicated to the application. As yet another example, if the application category is "Data Security" and the security level is, say, "Low," the detailed security steps necessary to implement that template might include (i) update application server to use an SSL connection to the database, or the like. As still another example, if the application category is "Intruder Protection" and the security level is, say, "High," the detailed security steps necessary to implement that template might include: (i) configure the security intelligence platform (e.g., IBM® QRadar) log sources, (ii) update SIEM filters for the application, and (iii) update IPS rules for the application. Of course, these are merely representative (non-limiting) examples of the security configuration changes. The particular changes that are implemented by the security assurance service will depend on the implementation and available resources (products, systems, configurations, and the like).

Thus, when the cloud provider deploys the application (or initiates the deployment), it notifies the security assurance service of the one or more selected (or otherwise defined or prescribed) security templates. Preferably, the cloud provider also sends the assurance service details of the application. The security assurance service takes the selected templates as guidance, and the broker component then tailors the detailed security configuration changes required for the existing environment to support the application within the selected security constraints that have been specified and the context of available resources (as determined by the context monitor). If desired, these security configuration changes may be presented to a security administrator for verification before being implemented. Upon verification (if that optional operation is implemented), the security assurance service preferably invokes remote interfaces for software configuration. In addition, and if necessary, the service communicates with the cloud provider to obtain information about any prerequisites (of the cloud provider) that may need to be addressed when deploying the application. These prerequisites may include, for example, creation of a VPN, or other security requirements unique to the provider.

Application-Based Security Rights (ABSR) in Cloud Environments

With the above as background, the techniques of this disclosure are now described.

As will be described, the technique of this disclosure provides the ability for a cloud application to specify its security requirements, the ability to have those requirements evaluated, e.g., against a specific cloud deployment environment, and the ability to enable the application to control the security assurance service to provision additional security technology in the cloud to support deployment (or re-deployment elsewhere) of the application if the environment does not have the necessary topology and security resources deployed.

Thus, and as will be seen, the approach herein provides for a mechanism to enable a cloud application to prescribe its own security requirements, and then to pass those requirements into (and for analysis by) the security assurance service. As noted, the security assurance service is responsible for generating and managing the security environments (the "secure application zones") for cloud applications. According to the approach herein, an application's security requirements may be defined at one or more levels of granularity, e.g., using generic requirements (e.g., "high security"), or specific requirements (e.g., TLS key length, etc.), as well as potential relationship requirements that describe the application's purpose and a relationship of the application to one or more other applications. The data set comprising the application's security requirements (the "application-based security rights" (ABSR) or "security rights" for short) is then exposed by the application to the cloud infrastructure "security assurance" service.

As explained in detail above, the security assurance service operates generally to deploy security environments (the "secure application zones") for applications running in the cloud environment. According to the technique of this disclosure, the security assurance service is enhanced or extended by interacting with the application directly to ensure that the application's ABSRs are adequately protected, namely, by ensuring that the application executes within an application security zone sufficient to meet the ABSR. To this end, and after the security assurance service deploys the security zone for the particular application, the application queries the service by passing (e.g., in an application payload) its security rights. If the security capabilities provided by the security assurance service are sufficient or better than the application's security rights, the application functions normally. If, however, the security environment established by the security assurance service is insufficient for the application, the application is afforded one or more remediation options, e.g., administrator notification, shut down (temporary self-deactivation) and administrator notification, issuing a request to the security assurance service to upgrade the security environment, issuing a request to the service to transfer the application to a different cloud security assurance zone, or to a cloud platform with a greater range of security capabilities, issuing a request to the service to transfer to a different cloud zone or cloud platform (e.g., to avoid a hosting conflict, etc.), or the like. The particular remediation options may vary, and the options may be attempted deterministically or in some otherwise configurable manner. In particular, the security assurance service then attempts to implement a remediation option. Upon completion of the option (e.g., upgrade of the security environment, transfer to a new environment, etc.), the application may again query the security assurance service, and the process may be repeated.

Thus, for example, if the remediation request is made to upgrade the security environment, upon upgrade completion the application again queries the security assurance service for the security environment details. Or, if the remediation request is made to transfer to a new environment, upon transfer completion the application again queries the service for the new security environment details. As the process iterates in this manner, if the security environment is still found to be deficient, further remediation attempts may be tried again. In the alternative, the process may escalate or even failover, e.g., by causing the application to shut-down (until the security environment mismatch is rectified) or to take still further alternative (perhaps more aggressive) measures to achieve its security requirements.

Typically, the described above approach of having the security assurance service validate its then-existing security zone for the application against the application-based security rights (ABSR) is carried out following application deployment (and following implementation of a remediation option), the same approach may be used during normal application processing in the environment. Thus, the approach may be carried out periodically, continuously, synchronously or asynchronously, such as when the application receives a notification that that the cloud environment has changed in some way.

Without intending to be limiting, the application security rights may be provisioning using a security rights module and configuration tooling that presents various configuration interfaces and options to an administrator or other permitted user.

Figure 7:
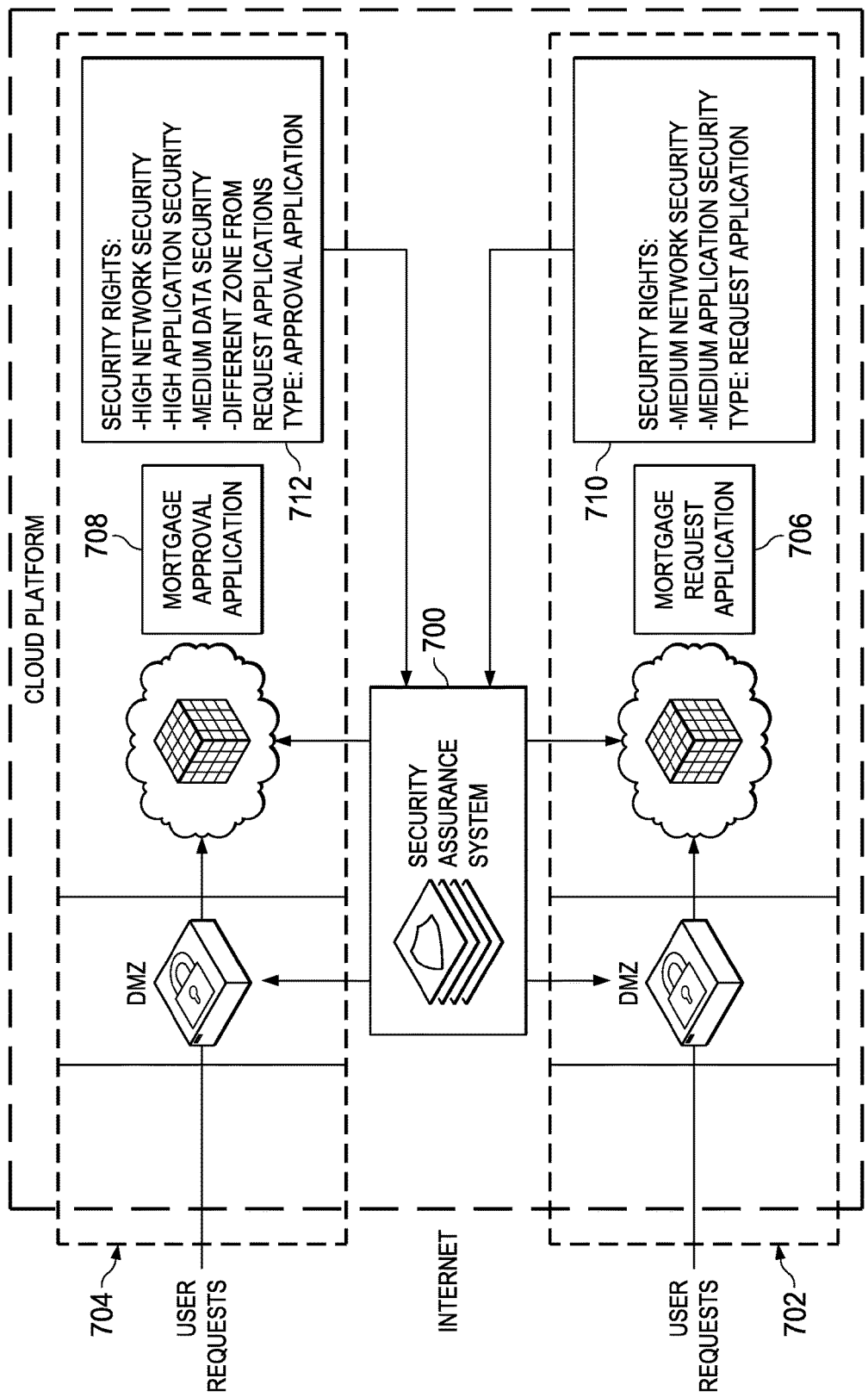
FIG. 7 illustrates a cloud operating environment in which a security assurance service has provisioned different application zones to host applications with distinct security requirements.

FIG. 7 illustrates a representative operating scenario wherein a security assurance service 700 has provisioned secure application zones 702 and 704. The secure application zone 702 hosts a first cloud application 706 (e.g., a mortgage request application), while the secure application zone 704 hosts a second, distinct cloud application 708 (e.g., a mortgage approval application). In this example scenario, which is not intended to be limiting, the applications 706 and 708 having distinct security rights specifications. Thus, the mortgage request application 706 has a relatively modest set of security rights 710 (e.g., "medium network security" and "medium app security") while the mortgage approval application 708 has a much higher set of security rights 712 (e.g., "high network security," "high app security," "medium data security" and a "different zone from request apps" hosting requirement). In this example, the security rights (the ABSR data set) for each application are specified at a generic level using terms typically understood by the security assurance service. As noted above, the ABSR may include specific security requirements at a much more fine-grained level as well. In this case of the mortgage approval application 708, the ABSR also includes application relationship information. Without meant to be limiting, such application relationship information may be specified by tag-like identifiers that describe the application's purpose, and that identify other applications or application types that cannot be hosted in the same security zone. Conflicts between hosted applications can be detected through a variety of matching methods, such as tags, group membership, or even more general text analytics such as keyword matching in application descriptions. Application relationship information (e.g., mortgage application 706 having a separation requirement from mortgage approvals generated by an approval application 708) may be defined by security policy using conventional policy management tooling.

Figure 8:
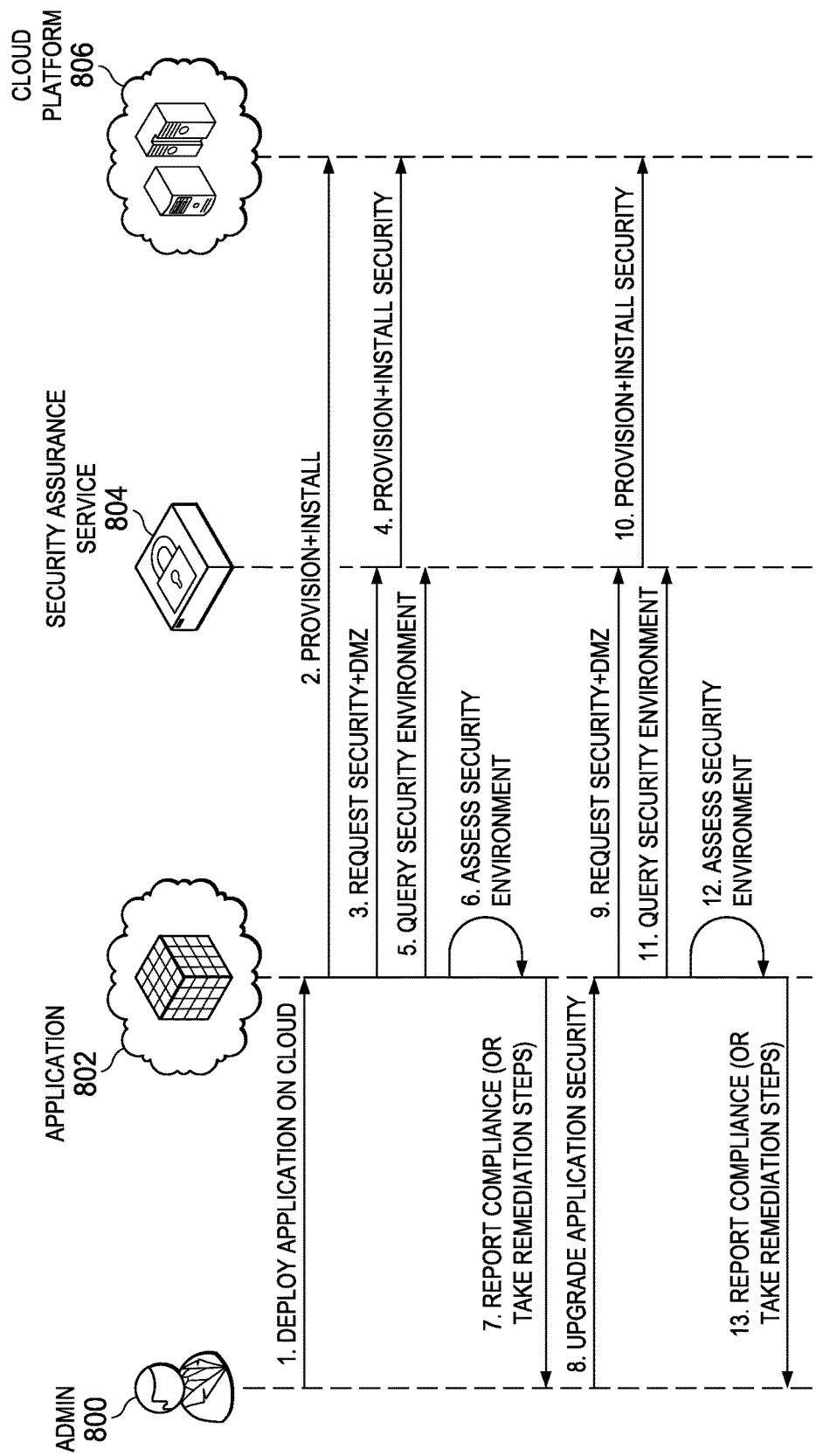
FIG. 8 depicts a sequence flow depicting a technique for application-based security rights validation according to this disclosure.

Although FIG. 7 depicts a pair of cloud applications, the techniques are applicable with respect to any particular cloud application. FIG. 8 illustrates the ABSR validation process in additional detail in a typical operating scenario involving a newly-deployed application interacting with the security assurance service. In this scenario, an administrator 800 uses a cloud deployment mechanism as described above to deploy cloud application 802 into the cloud platform 806. The security assurance service 804 operates in the manner described to configure and manage a secure application zone for the cloud application. The application 802 includes a set of security rights as specified by the administrator 800. The administrator 800 may change the security rights specified for the application 802 at any time. The system includes appropriate tooling (e.g., web-based configuration interfaces) by which the administrative configures the ABSR for the application. As noted above, these rights may be specified in a generic manner, in a specific manner, in a relationship-based manner, or combinations thereof.

At step (1), the administrator 800 deploys the application 802 on or to the cloud platform 806. At step (2), the application 802 is provisioned and installed in the cloud platform. At step (3), the application 802 queries the security assurance service 804 to provision the application security zone (and any required DMZ associated therewith). At step (4), the security assurance service 804 provisions and installs the security zone in the manner previously described or, alternatively, identifies an existing security zone that provides the requested level of security. At step (5), and according to this disclosure, the application 802 then queries the security assurance service 802 regarding the security environment that has been provisioned. Step (5) typically involves the application passing to service 804 its then-current ABSR (as provisioned by the administrator). Typically, the ABSR is passed in the application payload. At step (6), the security assurance service assesses the security environment to assess whether the security capabilities provided by the service are sufficient or better than the application's security rights. If so, the application 802 continues to execute within the security zone as if nothing is remiss. The application may report back to the administrator that it is operating within the security zone in a manner that is compliant with its ABSR). This is step (7). If, however, the outcome of the analysis at step (6) indicates that the security environment is insufficient for the application 802, the application reports back to the administrator 800 of the need to take one or more remediation steps. This is also indicated at step (7) as an alternative to reporting compliance.

Assume now that the analysis at step (6) indicates that the security zone is insufficient to satisfy the application's security rights. A remediation step is then taken. As noted above, the nature and extent, and/or sequencing of one or more remediation steps, is deterministic or configurable (and may even be context-sensitive). The administrator 800 may configure the remediation options, or these option(s) may be controlled by a policy. One or more options may be tried automatically, programmatically, or under control of the administrator. In this example scenario, the remediation option is an "upgrade app security" option. To this end, at step (8), the administrator 800 issues an upgrade request to the application 802, which at step (9) then passes that request to the security assurance service 804. At step (10), the security assurance service 804 responds to the request by upgrading the security environment. Step (10) in this scenario involves the creation of a new secure application zone, but it may also involve the updating of the original security zone (or modifying some characteristic thereof). At step (11), once again the application 802 queries the security assurance service 804 to determine the adequacy of the upgraded security environment. The security assurance service 804 assesses the security environment again at step (12). At step (13), the application reports compliance or the need to take other remediation steps, as previously described.

Although FIG. 8 illustrates the "upgrade" remediation option, other options may be tried. Options may be tried sequentially, or concurrently.

The particular remediation options may be varied, as noted. They include, without limitation, administrator notification, temporary shut-down of the application, temporary shut-down of sensitive parts of the application, temporary shut-down of the application coupled with administrator notification, issuing a request to the security assurance service to upgrade the security environment, requesting that the service transfer the application to a different cloud zone, or to a different cloud platform, in either case with a greater range of security capabilities, requesting transfer to a different cloud zone or cloud platform to avoid a hosting conflict, or the like. Preferably, application self-deactivation is undesirable from the administrator's point of view; thus, typically other remediation steps are prioritized over it, or sufficient warnings are provided to the administrator prior to actual shut-down.

As illustrated and described, typically the process of querying the security assurance service is executing iteratively, but this is not a requirement. If iterative processing is used, the nature and extent of the remediation may become more aggressive.

The above-described process may be carried out at any time including when the administrator 800 changes the security rights for the application, or when the underlying security changes in the cloud platform itself. If this causes the environment to be insufficient for the installed application, normal remediation options and steps (e.g., request upgrade, transfer or shut-down) are taken, as have been described.

Once ABSRs become available to the security assurance service, it can take those rights into consideration during its other provisioning activities. For example, the security assurance service would operate to avoid deploying a second application in an existing security environment if doing so would invalidate the security rights of the first application already deployed and operating there.

Without limitation, the redeployment of the cloud application to an environment with sufficient security (if that remediation option is implemented) may be done by the cloud platform 806, by the security assurance service 804, or through manual intervention by the administrator 800 using other deployment tooling.

The nature of the security rights may be quite varied, as has been described. The security rights also can extend to capture multiple types of requirements that can impact security, e.g., geographic location, company hosting, hardware environment, and the like.

An important advantage of the above-described approach is that the application is able to define and have ownership over its own security. This information is then leveraged by the security assurance service to facilitate checking and to perform remediation. The approach herein provides that the application has assurance that it can execute within a security environment with sufficient protections. The approach enables the cloud application to be executed whatever its security requirements may be. In an extreme example, an application with military or sensitive industrial ramifications may be written to only run on a disconnected Government datacenter. If that application were to get deployed in a less secure environment (either intentionally or by accident), the application developer's expectation would be that the application would fail to deploy and run. By the technique of this disclosure, the application obtains for itself the assurance that security of the environment is up to the standards required, and it is the responsibility of the cloud platform (through the assurance service) to convince the application that the environment indeed is sufficiently secure.

According to the described approach, preferably the application defines its security requirements, the security assurance service interprets the requirements and configures the environment as needed, an initial check is done to make sure the environment still meets requirements, followed by on-going checks as needed or as the application requirements or platform requirements change. This approach enables the application to be assured of the security environment at all times, even as the administrator might take some action (e.g. disable a security device either intentionally or by accident) that would or may be important for the application to know about and evaluate.

The technique herein may be implemented by interacting with (e.g., querying) the security assurance service, as has been described. The security assurance service takes the requirements from the application and selects (or builds) an environment to match. As noted, the application is able to query the security assurance service to understand the security qualities of the environment and to be assured they are sufficient. For remediation, the steps taken depend upon context and the nature of the remediation. In a simple example, the application just gets redeployed to an environment with higher security. Or, the security assurance service may deploy or reconfigure security appliances to meet the requirements. In more extreme cases, the assurance service is unable to provide a sufficiently-secure environment for the application, and in these cases the application just shuts itself down (or fails to start).

Thus, and without limitation, the application-security assurance service interaction as described herein may take place before the application is deployed, after the application is initially deployed (as described in FIG. 8), or any time after deployment.

As an alternative embodiment, the application can self-select and self-configure to a target cloud environment, as facilitated by the security assurance service.

As another alternative embodiment, the application's security rights trigger creation of a new security zone (by the security assurance service) if no zone(s) are then available. This may occur when the environment does not yet exist and the security assurance service is being used to set up the environment and provide the assurance. As an example scenario, assume the cloud platform provides the capability based on existing datacenters, such as a FISMA-compliant datacenter. If the application requires HSM encryption capability that is not available, the cloud platform would have the opportunity to deploy the added capability as needed (even manually if need be).

An application's security right may be too high for the target environment. In this case, the target platform optionally may retain the option to deploy the application if the environment capabilities become upgraded at a later point in time. This also gives platform administrators an idea of the security requirements in demand, and they can respond with infrastructure provisioning.

The following are several concrete examples. The security rights may trigger an application to be hosted on SoftLayer® Public Virtual Systems or SoftLayer Private Virtual Systems based on specified application container segregation rights. The security rights may trigger an application to be hosted on a SoftLayer Germany datacenter as opposed to a SoftLayer U.S. datacenter based, for example, on specified EU compliance rights. An application may require protection of keys using a hardware security module (HSM), and this right would trigger the application based on availability of specialized HSM hardware. An application being deployed alongside another workload may trigger upgrade of the key length in the SSL proxy. An application being deployed into a clean-slate environment can get the environment configured precisely as needed, in any configuration that provides sufficient capability For an application whose security rights are raised in a live system, if the system is under management of an application zone-type capability, the environment can be upgraded to match changing rights or the application can be relocated to a sufficiently capable environment. In an enterprise, the assurance service could be run by the CISO team, and apps are deployed by the app teams. When apps are deployed, the CISO team may inject a check in the orchestration that checks with the assurance service to identify which cloud to use, which template to pull down for policies, and so forth. The security assurance service could also run as a web service, where apps define what they need, and the service identifies which clouds match the requirements and are endorsed by that provider. This information can be used to identify which zones need to be created based, for example, on application requirements that cannot be satisfied at a point-in-time.

Compliance data (e.g., SCAP, OVAL and XCCDF) can be used as input to the security rights module to identify security needs. These specifications also can be used as protocols between the rights module and the security assurance service. In such circumstance, the solution handles translation of requirements between formats. For a detailed protocol example, the assurance service may query a provider like DataPower or SoftLayer to determine the security provided. This requires the application, assurance provider and devices to all communicate security requirements. The protocol could be an implementation detail or provided through known specifications or standards. The security assurance service would understand these requirements and contact the appropriate provider as necessary to guarantee its configuration. The communication from the assurance service to the DataPower could optionally use a different specification, in which case the assurance provider internally maps between the specification used by the application and the specification used by provider devices.

Of course, the above example scenarios and variants should not be taken to limit the disclosed subject matter.

The technique of this disclosure provides numerous advantages. The approach advantageously enables application-defined security service requirements to be enforced in cloud environments. By integrating with the cloud-based security assurance service, the approach enables the cloud application to define and enforce its own security requirements, even if those requirements are changing. In the approach, the application integrates with and thus leverages the security assurance system to determine if the security environment is sufficient. The approach further enables the application to invoke reconfiguration of the security environment by security assurance service to enforce the application's security service requirements. The security assurance service responds as needed, e.g., to re-locate the application, upgrade the environment, or, in extreme cases, enable application deactivation or start inhibition. The approach works in real-time, even as application security requirements (or the security resources in the cloud platform) change. The security environment is reconfigured in response to these changing security requirements. The approach enables continual monitoring of changes in the cloud environment and notification to the application to evaluate its security requirements even as conditions change.

The application security rights may be associated with the application by being incorporated into the application (as a payload), by being accessible to the application, or the like. The mechanism to enable the application to interact with the security assurance service may be application native code, a plug-in, an application wrapper, a library, a cloud-based application environment bundle (pattern, stack or recipe), or the like. In one embodiment, the functionality herein may be implemented as an ABSR service that obtains security environment data by interacting with the security assurance service. An application can use the ABSR service to interact on its behalf with the security assurance service.

As described, preferably the security assurance service reconfigures (e.g., modifies, merges, splits, re-locates) the security zones to meet ABSR requirements. Some of the distinct functionality of the ABSR service, on the one hand, and the security assurance service, on the other, may be shared (co-mingled) depending on implementation.

Regardless of how it is implemented, the technique of this disclosure preferably keeps running to continually revalidate the application's security requirements.

For additional background, the following describes representative or additional capabilities of the security assurance service. One or more of these additional capabilities may be provided as desired.

The security assurance service may analyze an existing security environment to identify interactions for customized configuration steps, e.g., the service may determine that a virtual private network (VPN) may not be necessary in a particular configuration because the network is already isolated by some other device, network or mechanism.

The security assurance service may operate to update configurations based on other deployments. Thus, for example, if a web security gateway is deployed and is already using certificates for other applications, the security assurance service may recognize this and merely upgrade the newly-deployed application to use certificates as well.

Preferably, security templates available in the system (e.g., in a pattern editor) may include wiring and interaction logic. As a simple example, if a high-level "Intruder Protection" template has been selected, the system will inhibit a lower level template of this type from being applied. As another more complex example, a security administrator may have set a policy that the network must be at least as secure as the applications it hosts; then, if the user selects high-level data security, the internal network security may be automatically upgraded (e.g., in the pattern editor) to high-level.

Preferably, a security administrator interacts with the security assurance service directly to apply templates to existing deployments, e.g., to upgrade security settings for an application that may have been attacked.

Preferably, the service enables a security administrator to override a particular categorization. As a non-limiting example, a highly-secure bank network may require a higher level of controls even with respect to an otherwise "low-level" security category.

Preferably, the security assurance services records configuration settings and can remove security configuration steps when an application is removed from the system. This security "removal" function preferably also interacts with other systems, e.g., optionally downgrading security levels of other applications if their security has been upgraded only for the application being removed.

Preferably, the security administrator is provided the ability to change security templates available in the service, as well as the ability to change rules around which templates must be used in certain circumstances.

Preferably, the security assurance service interacts with one or more cloud platforms for management of the virtualized resources. Thus, for example, the security assurance service may query existing software catalogs in the enterprise to determine security software installed, as well as their locations and available resources. The service also may try to auto-discover software in the network, or it may query specific security solutions (such as a log manager) to discover other software installed in the system.

Preferably, and if resource consumption from high-level security options are a concern, the security assurance service can estimate overall cost of the selected security template(s) and present this information to the application deployer for approval. Or, a security expert optionally may configure "maximum" and "minimum" total security levels allowed and required for particular types of applications.

Preferably, a security administrator can use the security assurance service to prevent deployment of applications if security templates of minimum security levels have not been selected.

Preferably, the security assurance service can mine patterns between application deployments and commonly selected security levels to automatically suggest security levels for new applications being deployed.

Preferably, the security assurance service can interact or interoperate with security analytics systems or services (e.g., Rational AppScan) during application deployment to gauge overall security level of a deployed application and determine if it fits within an enterprise security policy.

The service also preferably provides for "patching" of security assurance templates, either manually or automatically (e.g., through an auto-update tool), to improve security recommendations based on selected templates, and to retroactively apply new security configurations to existing applications.

Preferably, the service can receive reports or other outputs describing common vulnerabilities or attack pattern files (e.g. APT patterns) and determine if such an attack would be prevented with an existing security configuration. In the event of possible attack exposure, the service then generates and optionally applies configuration changes to protect the environment.

As noted above, preferably the security assurance service operates in conjunction or in association with existing cloud application platform infrastructure including, without limitation, a cloud application platform with workload deployment functionality. In this manner, the security assurance service supplements or works across the cloud infrastructure to facilitate secure context-based application deployment.

The security templates and their associated security configuration changes are implemented during the application deployment process. In that example, the application deployment is initiated, then the security configuration changes are carried out, after which the remainder of the application deployment process contemplates. While this is a typical operating scenario, the security configuration changes may be implemented orthogonally to the actual deployment itself. Thus, for example, the security configuration changes may be implemented in an off-line process before the actual application deployment is initiated. In the alternative, the application deployment may be in initiated and completed, and then followed by a separate execution thread of the security assurance service. Thus, a given context-based cloud application security zone may be created before, during or after actual application deployment.

The tooling required for implementing the security configuration changes for one or more particular security resources (as identified by a particular security template) may be specified or controlled by the template directly, or indirectly.

As described, the approach herein may be implemented manually or in an automated manner, in whole or in part.

While a preferred operating environment and use case (a cloud deployment appliance or platform) has been described, the techniques herein may be used in any other operating environment in which it is desired to deploy applications or other services while enforcing a given security context.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the security assurance service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment as described above, the functionality provided herein is implemented as an adjunct or extension to an existing cloud compute deployment or burst management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, computing entities that manage cloud deployments, as well as improvements to the functioning of the cloud application itself.

Having described our invention, what we now claim is as follows.

The invention claimed is:

1. A method to improve a cloud computing environment by enabling enforcement of security service requirements for a cloud application, comprising:

deploying a secure application zone for the cloud application, the secure application zone configuring a set of security resources in an automated manner in response to receipt of a specification of a security assurance level, the security assurance level specifying one or more general security requirements in a manner that does not expose at least some specific tooling requirements necessary to implement the security assurance level security requirement;

receiving from the cloud application one of: a set of security service requirements specified by the cloud application, and a changed set of security service requirements specified by the cloud application;

evaluating the security service requirements received against one of: the set of security resources configured in the secure application zone, and a changed set of security resources configured in the secure application zone; and responsive to a determination that the set of security resources configured in the secure application zone do not meet the security service requirements specified by the cloud application, receiving from the cloud application a request to take a given action that provides an assurance that the security service requirements specified by the cloud application are satisfied, wherein the given action is a remediation action that attempts to meet the security service requirements specified by the cloud application, the remediation action being one of: requesting upgrade or reconfiguration of the set of security resources configured in the secure application zone, requesting transfer of the cloud application to another specific cloud security environment, and requesting transfer of the cloud application to another cloud platform.

2. The method as described in claim 1 wherein the given action temporarily de-activates the cloud application or prevents the cloud application from starting.

3. The method as described in claim 1 wherein the set of security service requirements specified by the cloud application include one of: a generic security level requirement that as specified does not expose at least some specific security resource requirements necessary to implement the security level, one or more specific security resource requirements, and one or more relationship-specific criteria associated with the cloud application.

4. The method as described in claim 3 further including:
evaluating the relationship-specific criteria; and
responsive to the evaluation, restricting another cloud application from being hosted in association with the cloud application.

5. The method as described in claim 1 wherein evaluating the security service requirements specified by the cloud application against the set of security resources configured in the secure application zone includes:
providing a security assurance service with a query that includes the set of security service requirements specified by the cloud application; and
receiving from the security assurance service a response that includes the determination.

6. Apparatus, comprising:
a processor;
computer memory holding computer program instructions executed by the processor to improve a cloud computing environment by enabling enforcement of security service requirements for a cloud application, the computer program instructions comprising program code operative to:
deploy a secure application zone for the cloud application, the secure application zone configuring a set of security resources in an automated manner in response to receipt of a specification of a security assurance level, the security assurance level specifying one or more general security requirements in a manner that does not expose at least some specific tooling requirements necessary to implement the security assurance level security requirement;
receive from the cloud application one of: a set of security service requirements specified by the cloud application, and a changed set of security service requirements specified by the cloud application;

evaluate the security service requirements received against one of: the set of security resources configured in the secure application zone, and a changed set of security resources configured in the secure application zone; and responsive to a determination that the set of security resources configured in the secure application zone do not meet the security service requirements specified by the cloud application, receiving from the cloud application a request to take a given action that provides an assurance that the security service requirements specified by the cloud application are satisfied, wherein the given action is a remediation action that attempts to meet the security service requirements specified by the cloud application, the remediation action being one of: requesting upgrade or reconfiguration of the set of security resources configured in the secure application zone, requesting transfer of the cloud application to another specific cloud security environment, and requesting transfer of the cloud application to another cloud platform.

7. The apparatus as described in claim 6 wherein the given action temporarily de-activates the cloud application or prevents the cloud application from starting.

8. The apparatus as described in claim 6 wherein the set of security service requirements specified by the cloud application include one of: a generic security level requirement that as specified does not expose at least some specific security resource requirements necessary to implement the security level, one or more specific security resource requirements, and one or more relationship-specific criteria associated with the cloud application.

9. The apparatus as described in claim 8 wherein the program code is further operative to:
evaluate the relationship-specific criteria; and
responsive to the evaluation, restrict another cloud application from being hosted in association with the cloud application.

10. The apparatus as described in claim 6 wherein the program code operative to evaluate the security service requirements specified by the cloud application against the set of security resources configured in the secure application zone is further operative to:
provide a security assurance service with a query that includes the set of security service requirements specified by the cloud application; and
receive from the security assurance service a response that includes the determination.

11. A computer program product in a non-transitory computer readable medium for use in a data processing system, the computer program product holding computer program instructions executed by the data processing system to improve a cloud computing environment by enabling enforcement of security service requirements for a cloud application, the computer program instructions comprising program code operative to:
deploy a secure application zone for the cloud application, the secure application zone configuring a set of security resources in an automated manner in response to receipt of a specification of a security assurance level, the security assurance level specifying one or more general security requirements in a manner that does not expose at least some specific tooling requirements necessary to implement the security assurance level security requirement;

receive from the cloud application one of: a set of security service requirements specified by the cloud application, and a changed set of security service requirements specified by the cloud application;

evaluate the security service requirements received against one of: the set of security resources configured in the secure application zone, and a changed set of security resources configured in the secure application zone; and responsive to a determination that the set of security resources configured in the secure application zone do not meet the security service requirements specified by the cloud application, receiving from the cloud application a request to take a given action that provides an assurance that the security service requirements specified by the cloud application are satisfied, wherein the given action is a remediation action that attempts to meet the security service requirements specified by the cloud application, the remediation action being one of: requesting upgrade or reconfiguration of the set of security resources configured in the secure application zone, requesting transfer of the cloud application to another specific cloud security environment, and requesting transfer of the cloud application to another cloud platform.

12. The computer program product as described in claim 11 wherein the given action temporarily de-activates the cloud application or prevents the cloud application from starting.

13. The computer program product as described in claim 11 wherein the set of security service requirements specified by the cloud application include one of: a generic security level requirement that as specified does not expose at least some specific security resource requirements necessary to implement the security level, one or more specific security resource requirements, and one or more relationship-specific criteria associated with the cloud application.

14. The computer program product as described in claim 13 wherein the program code is further operative to:

evaluate the relationship-specific criteria; and responsive to the evaluation, restrict another cloud application from being hosted in association with the cloud application.

15. The computer program product as described in claim 11 wherein the program code operative to evaluate the security service requirements specified by the cloud application against the set of security resources configured in the secure application zone is further operative to:

provide a security assurance service with a query that includes the set of security service requirements specified by the cloud application; and receive from the security assurance service a response that includes the determination.

\* \* \* \* \*